US007287791B2

(12) United States Patent
Carolina

(10) Patent No.: US 7,287,791 B2
(45) Date of Patent: Oct. 30, 2007

(54) WING HOLDER

(76) Inventor: Raymond H. Carolina, 11 E. Market St., Long Beach, NY (US) 11561

( * ) Notice: Subject to any disclaimer, the term of this patent is extended or adjusted under 35 U.S.C. 154(b) by 0 days.

(21) Appl. No.: 11/401,544

(22) Filed: Apr. 11, 2006

(65) Prior Publication Data

US 2006/0249967 A1 Nov. 9, 2006

Related U.S. Application Data

(60) Provisional application No. 60/671,246, filed on Apr. 14, 2005.

(51) Int. Cl.
*A47J 43/28* (2006.01)

(52) U.S. Cl. ........................ 294/99.2; 294/16; 294/902

(58) Field of Classification Search .................... 294/3, 294/8.5, 11, 16, 33, 99.2, 25, 902; D7/685, D7/686
See application file for complete search history.

(56) References Cited

U.S. PATENT DOCUMENTS

| | | | | |
|---|---|---|---|---|
| 1,715,089 A | * | 5/1929 | Jones | 81/64 |
| D138,917 S | * | 9/1944 | Frank | D7/686 |
| 2,768,856 A | * | 10/1956 | Wright | 294/99.2 |
| 2,839,325 A | * | 6/1958 | Jeanfavre | 294/99.2 |
| 3,889,995 A | | 6/1975 | Lin | |
| 3,934,915 A | | 1/1976 | Humpa | |
| 4,079,765 A | * | 3/1978 | Hatayan | 81/44 |
| 4,707,922 A | | 11/1987 | Hosak-Robb | |
| 4,728,139 A | | 3/1988 | Oretti | |
| D306,955 S | | 4/1990 | Mehta et al. | |
| D317,106 S | | 5/1991 | Kosurko | |
| D319,373 S | | 8/1991 | Kosurko | |
| 5,044,058 A | * | 9/1991 | Voss | 29/278 |
| 5,199,756 A | | 4/1993 | Bartlett et al. | |
| D357,846 S | | 5/1995 | McNaughton | |
| 5,634,719 A | | 6/1997 | La Neve | |
| 5,709,423 A | * | 1/1998 | Romero | 294/25 |
| D423,305 S | * | 4/2000 | Foster et al. | D7/686 |
| 6,092,847 A | | 7/2000 | Kwan | |
| D447,430 S | | 9/2001 | Kehoe | |

(Continued)

FOREIGN PATENT DOCUMENTS

GB 1 442 322 7/1976

OTHER PUBLICATIONS

Tongs at http://www.foodservicedirect.com/index.cfm/S/159/Tongs.htm dtd. Jul. 18, 2005.

*Primary Examiner*—Dean J Kramer
(74) *Attorney, Agent, or Firm*—Harold G. Furlow, Esq.

(57) ABSTRACT

A wing holder is described that includes a pair of arms that are connected by a joint. The joint provides a flexible hinge for the movement of the arms between a first and second position for the seizing and engagement of appetizers, hors d'oeuvres, and other courses that include food pieces such as chicken wings and ribs. Jaws are positioned on the distal ends of the arms that include a distal first row of teeth and a second proximal row of teeth. The distal first row of teeth defines a notch for the retention of the food pieces during the eating process. The second row of teeth also engages and assists in the retention of the food pieces in the wing holder.

16 Claims, 12 Drawing Sheets

U.S. PATENT DOCUMENTS

| | | | |
|---|---|---|---|
| 6,494,517 | B1 | 12/2002 | Durant |
| 6,536,819 | B2 | 3/2003 | Wang et al. |
| D473,111 | S | 4/2003 | Kortleven et al. |
| D488,032 | S | 4/2004 | Best et al. |
| 6,869,117 | B1 | 3/2005 | Blum |
| D505,599 | S | 5/2005 | Fiedeler et al. |

* cited by examiner

WING HOLDER

This application claims the benefit of U.S. Provisional Application 60/671,246 filed on 14 Apr. 2005.

FIELD OF THE INVENTION

The present invention relates to devices that clench food pieces and more specifically to finger manipulated devices that assist in the eating of food.

BACKGROUND OF THE INVENTION

Tong devices are structured for the seizing and holding food. The typical tong structure includes a joint that connects a pair of arms that have opposed jaws. The jaws have a specialized structure for their intended function and can move between an open and a closed position.

The specialized structure of the jaw of each kind of tong provides functional advantages that can also limit that same tong in other applications. For example, ice tongs have sharp pointed teeth in each jaw and a length that is adept for seizing and transferring a cube of ice from an ice bucket to a glass. In contrast, barbecues tongs have an extended arm length and jaws with teeth for engaging and manipulating larger pieces of meat at a distance in an unconfined environment.

The popularity of appetizers, hors d'oeuvres, and other courses that include foods such as chicken pieces, chicken wings and ribs has also created less than favorable circumstances for consumers. These foods frequently have coatings to improve their flavor that can include oils, sauces, spices or dressings. Eating these foods commonly leaves the remnants of these coatings undesirably stuck to the hands of the consumer. Similar problems occur when pieces of food are dipped into a sauce, dip or melted butter, for example, and the dip drips on to the hand of the consumer. While a number of tong type devices exist, none of the devices combine a specialized jaw structure with the ability to clench and manipulate foods for the ease of consumption by the consumer.

A device is needed that can readily clench pieces of food within its jaws and manipulate the food pieces for ease of consumption.

SUMMARY OF THE INVENTION

A wing holder is disclosed that comprises a joint that connects a first elongate arm and a second elongate arm. The arms extend in an adjacent relationship to one another from the joint. A first arm defines a first straight axis and has a distal end portion and a proximal end portion. A second arm defines a second straight axis and has a distal end portion and a proximal end portion. The arms have opposed inwardly facing surfaces and outwardly facing surfaces.

A jaw is connected to the distal end portion of the inwardly facing surface of the arms. Each of the jaws includes a set of teeth that have at least one row of teeth that has a distal face, a proximal face, outer sides and define a terminal free end. The rows of teeth extend from the inwardly facing surface of each of the arms in a direction towards the adjacent arm.

A notch is defined by the terminal free end of each of the rows of teeth. The terminal free end of each of the rows of teeth extends to a first height from the axis defined by each arm in proximity to the outer sides and the terminal free end extends to a second lower height from the axis defined by each arm in proximity to the center portion between the outer sides of the row of teeth.

The jaw can include a second set of teeth that are proximal to the first set of teeth and fixedly positioned on the arm. The notches defined in the terminal free ends of the sets of teeth are concave. The joint flexes to move the arms between a first and a second position.

The jaws are open in the first position and the jaws are closed in the second position. Alternatively, the jaws are closed in the first position and the jaws are open in the second position. The joint connects the proximal end portion of the arms. The joint is alternatively positioned between distal end portion of the arms and the proximal end portion of the arms. The second set of teeth of each jaw has a terminal free end that defines a notch.

A wing holder is disclosed that comprises a pair of elongate arms connected by a joint. The arms extend in an adjacent relationship to one another from the joint. A first arm defines a first straight axis and has a distal end portion and a proximal end portion. A second arm defines a second straight axis and has a distal end portion and a proximal end portion. The arms have opposed inwardly facing surfaces and outwardly facing surfaces and outwardly facing side edges.

A jaw is positioned on the distal end portion of each of the arms that includes a first set of teeth. Each first set of teeth includes a first row of teeth that has a distally directed face, a proximally directed face, outer sides and a terminal free end that extends towards the jaw of the adjacent arm.

A notch is defined by the terminal free end of each of the first rows of teeth. The notch on the first row of teeth of each of the arms is defined by a first height from the axis of the arm to a central portion of the terminal free end between the outer sides that is less than a second height from the axis of the arm to the outer sides portions of the first row of teeth. A second set of teeth is included in each jaw that is fixedly positioned proximal to the first set of teeth.

The wing holder can also comprise a joint that connects a first elongate arm and a second elongate arm. The arms extend in an adjacent relationship to one another from the joint. A first arm defines a first straight axis and has a distal end portion and a proximal end portion. A second arm defines a second straight axis and has a distal end portion and a proximal end portion. The arms have opposed inwardly facing surfaces, outwardly facing surfaces and outer side edges.

A jaw is connected to the distal end portion of the inwardly facing surface of each of the arms. Each of the jaws has a first set of teeth that includes a first row of teeth and a set second of teeth that includes a second row of teeth. The first row of teeth and second row of teeth are separate and positioned in fixed spaced relation. Each of the rows of teeth has a distal face, a proximal face, outer sides, and a terminal free end. The sets of teeth extend in a direction approximately towards the adjacent arm.

A notch is defined by the terminal free ends of the first row of teeth. The second rows of teeth on each arm have a height that extends from the straight axis of that arm that is less than or equal to the height of the first row of teeth from the straight axis of that arm.

The wing holder has inwardly facing surfaces that vary in height between the outer side edges of the arms and the rows of teeth have an approximately uniform length from the inwardly facing surfaces and the terminal free ends of the rows of teeth to define a notch. The inwardly facing surfaces are arcuate between the outer side edges of the arms and the terminal free end of the row of teeth has an approximately uniform length that defines an arcuate notch.

BRIEF DESCRIPTION OF THE DRAWINGS

Preferred embodiments of the invention are described below with reference to the drawings, wherein like numerals are used to refer to the same or similar elements.

DETAILED DESCRIPTION

Figure 1:
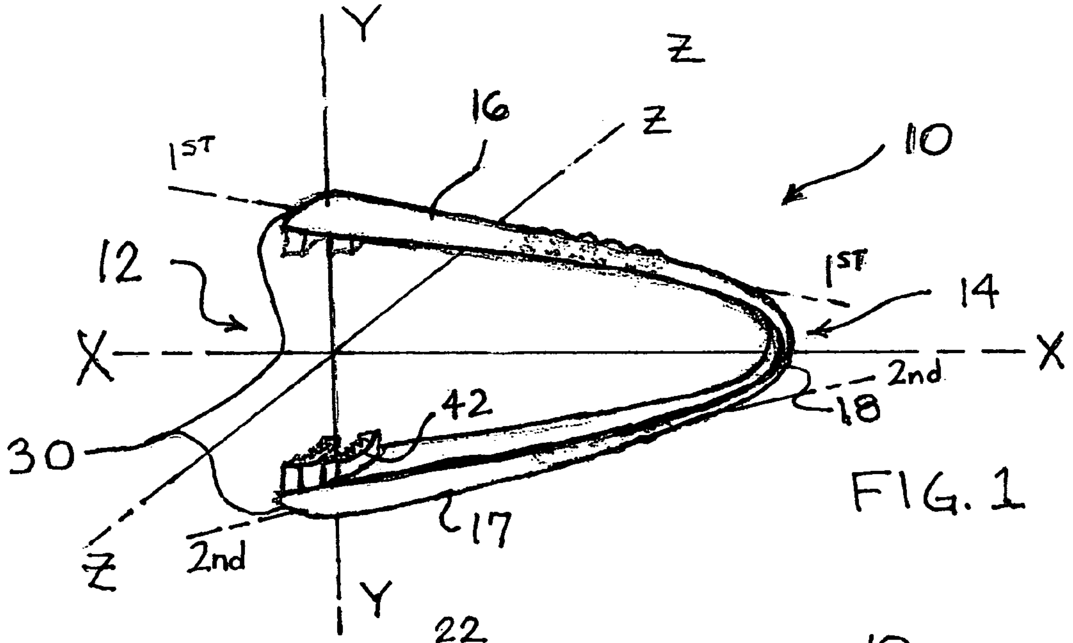
FIG. 1 is a side perspective view of the wing holder constructed in accordance with the present disclosure in a first position.

Referring to FIG. 1, a wing holder 10 is shown that is adapted for use with items such as ribs, chicken wings, chicken legs, appetizers and hors d'oeuvres. Wing holder 10 has a distal end portion 12 and a proximal end portion 14. A first cantilevered arm 16 and a second cantilevered arm 17 of wing holder 10 are connected by a joint 18. Distal end portion 12 includes two opposed and aligned jaws 30. Joint 18 provides for the movement of arms 16 and 17 between a first position and a second position. Distal end portion 12 and proximal end portion 14 define a longitudinal axis-X. An axis-Y extends through jaws 30 and is perpendicular to axis-X. An axis-Z is perpendicular to axes X and Y.

Figure 2:
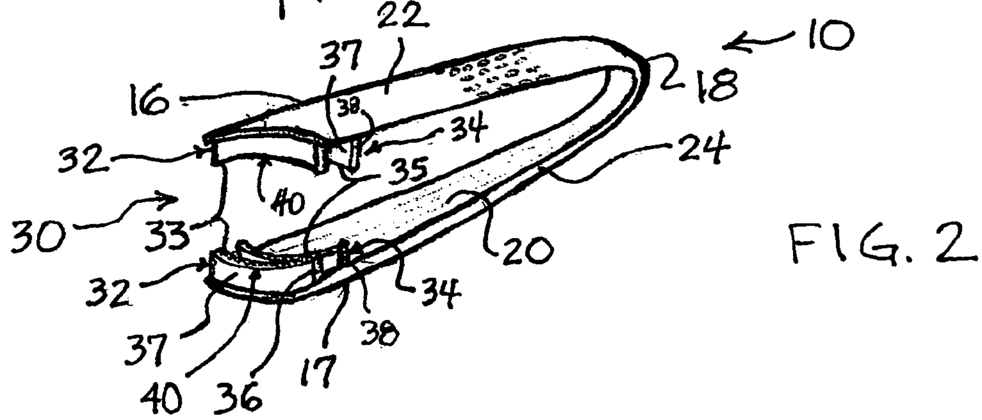
FIG. 2 is a front and side perspective view of the wing holder of FIG. 1.
Figure 3:
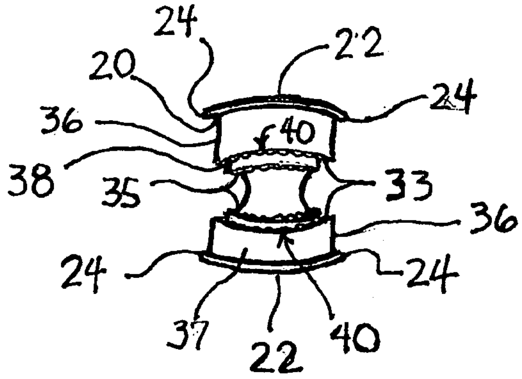
FIG. 3 is a front view of the wing holder of FIG. 1.

As shown in FIGS. 1-3, arms 16 and 17 each have an inner or inwardly facing surface 20, an outer or outwardly facing surface 22 and outer longitudinal side edges 24. Arm 16 defines a straight first axis that has a distal end portion and a proximal end portion. Arm 17 defines a straight second axis that has distal end portion and a proximal end portion. Arms 16 and 17 are preferably rigid, but can include some flexibility along their respective axes. Knurling, raised portions, indentations, or other forms of grip enhancements 26 can be included on the outer facing surfaces 22 of arms 16 and 17. Arms 16 and 17 have an arcuate cross-sectional shape in a plane Y-Z, defined by axes Y and Z that is concave approximately towards axis-X in this one preferred embodiment. This concave cross-sectional shape can advantageously provide stronger arms 16 and 17 that are less resistant to bending or twisting and use less material.

Joint 18 is preferably a hinge that sets arms 16 and 17 at an initial predetermined position and moves arms 16 and 17 between the first position and the second position. Joint 18 provides a resilient force to return arms 16 and 17 of wing holder 10 to the initial or first position. In this preferred embodiment, joint 18 is flexible hinge that has an arcuate shape that initially positions arms 16 and 17 in the open position. Joint 18 flexes between the first and the second positions by the application and removal of force-A (see FIG. 8) on arms 16 and 17. It is understood that arms 16 and 17 can be connected or joined by any number of techniques known in the art that creates the desired movement and resilience to include for example, heat bonding, fasteners, machining or molding. Similarly a separate bias member can be used to provide the resilient force to return arms 16 and 17 to the initial position after flexing.

Each jaw 30 has a first set of opposed teeth 32 and a second set of opposed teeth 34 that extend in a direction from the inner facing surface 20 of arms 16 and 17 and in the general direction of the opposed arm 16 or 17. Each set of teeth 32 and set of teeth 34 include a row of teeth 33 and a row of teeth 35, respectively. Set of teeth 32 has outer longitudinal edges 36 and set of teeth 34 has outer longitudinal edges 38. In a closed position of wing holder 10, sets of teeth 32 of each jaw 30 are at least in close proximity.

First row of teeth 33 of first set of teeth 32 in this preferred embodiment includes a plurality of individual teeth in one or more rows that are connected to inwardly facing surface 20. The row of teeth 33 has a distally oriented face, a proximally directed face and outwardly facing sides. Row of teeth 33 can include a base 37 that is connected to inwardly facing surface 20. Alternatively each row of teeth 33 can be connected directly to or, for example, be monolithically formed as part of one of arms 16 and 17. Each row of teeth 33 preferably extends approximately perpendicular to the axis defined by its respective arm 16 or 17.

Each tooth within the row of teeth 33 has a terminal free end or tip that is a point or edge. The terminal edge or edges of rows of teeth 33 extend between the outwardly facing sides 36. A notch 40 is defined by the tips of the rows of teeth 33 between edges 36. Using arm 16 as an example, the portion of the row of teeth 33 that is in proximity to edges 36 extends further from the first axis, than the portion of set of teeth 33 centrally positioned between edges 36 extends from the first axis. In this preferred embodiment, notch 40 has an arcuate concave shape between outer edges 36 that can extend the full distance or a portion of the distance between the outer edges 36. Row of teeth 33 of arm 17 preferably includes an identical notch 40. The shape of notch 40 can be any shape to include geometric shapes such as arcuate or angular, for example, and can further include serrations or separations that define a plurality of individual teeth.

In this preferred embodiment, each tooth within row of teeth 33 can also extend the same predetermined distance from the arcuate inwardly facing surface 20 of each arm 16 or 17. The fixed length row of teeth 33 combined with the concave arcuate shape of inwardly facing surface 20 between outer longitudinal side edges 24 in this preferred embodiment defines a concave arcuate notch 40 that is approximately parallel to that of inwardly facing surface 20. This embodiment can advantageously provide less complex and readily molded rows of teeth rows of teeth 33 and 35 that extend from inwardly facing surface 20 approximately towards the opposing arm 16 or 17 an approximately uniform distance to form notch 40. The uniform height of rows of teeth 33 and 35 also advantageously provides a consistent structural strength between edges 36 and 38, respectively.

Continuing with this preferred embodiment, jaws 30 can be identical or include different rows of teeth 33 on arms 16 and 17. For example, one jaw 30 can include a row of teeth 33 that includes a plurality of teeth that are specially configured for the gripping of smaller food portions such as wings and include for example, arcuate proximally extending terminal free ends. The remaining jaw can define one or more teeth that have a terminal free end that define an edge, for example.

In this embodiment row of teeth 33 are a plurality of fine teeth 33 that extend from the upper surface of base 37. Teeth 33 preferably have an angular orientation that provides an additional ability to securely seize food items. The directional orientation of individual teeth can, for example, randomly vary or be selectively uniformly angled proximally, distally and/or laterally (approximately towards or away from the Z-axis) from the Y-axis (see FIG. 1). Rows of teeth 33 can also include arcuate terminal ends or apexes to enhance the seizing of items.

Continuing with the preferred embodiment, jaws 30 include a second set of teeth 34 that are separated by a predefined distance along the axis of each arm and positioned proximal to first set of teeth 32. Second set of teeth 34 are preferably approximately identical to first set of teeth 32 and include row of teeth 35. In this preferred embodiment, a notch 42 is defined by the terminal free end of each second row of teeth 35 that is approximately identical to notch 40. Second set of teeth 34 can similarly use a base 37 or be directly connected to inner surface 20 of arms 16.

Wing holder 10 is preferably made of a polymer that is injection molded and monolithically formed. It is understood that wing holder 10, however, can be made of and/or include other materials such as for example, metals, cellulose and composites. The length of wing holder along the first or second axis is preferably approximately 8.5 cm and the lateral width along Z-axis is preferably approximately 2 cm. The height of the rows of teeth 33 of the first set of teeth 32 above inner facing surface 20 is preferably approximately 0.7 cm. It is understood that these dimensions can vary with the differing applications of wing holder 10.

Figure 4:
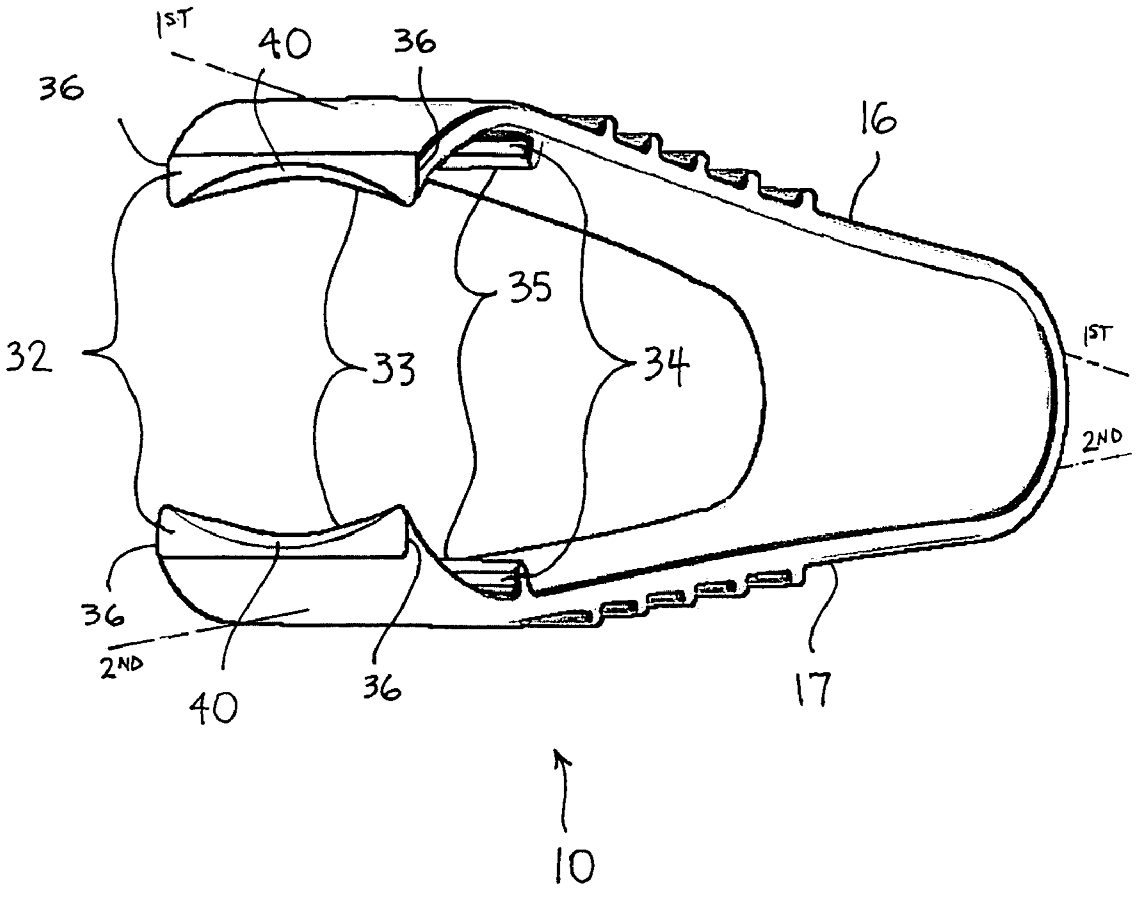
FIG. 4 is a front and side perspective view of a second embodiment of the wing holder of FIG. 1 in the first position.
Figure 5:
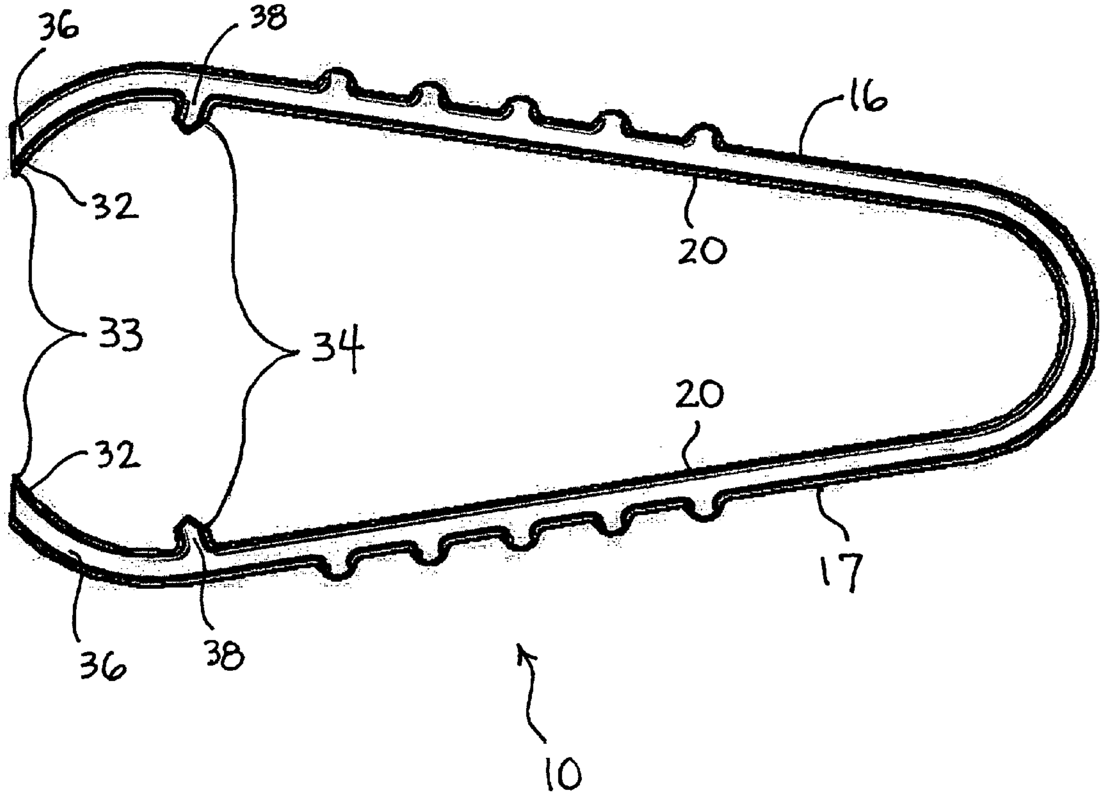
FIG. 5 is a side view of the wing holder of FIG. 4.

Referring now to FIGS. 4 and 5, a second embodiment of wing holder 10 includes arms 16 and 17 being connected by joint 18 as described previously. The distal end portions of arms 16 and 17 have an arcuate shape that extends at least partially in an inward direction from the first and second axes, respectively. Arms 16 and 17 have an approximately rectangular cross-sectional shape in a plane Y-Z, defined by axes Y and Z (see FIG. 1) in this preferred embodiment. Set of teeth 32 extend inwardly from arms 16 and 17 at an angle that is approximately perpendicular to the first and second axes. Alternatively, the distal end portion of arms 16 and 17 can be truncated to define set of teeth 32. Set of teeth 34 is positioned proximal to set of teeth 32 in each jaw 30 as described previously.

Figure 6:
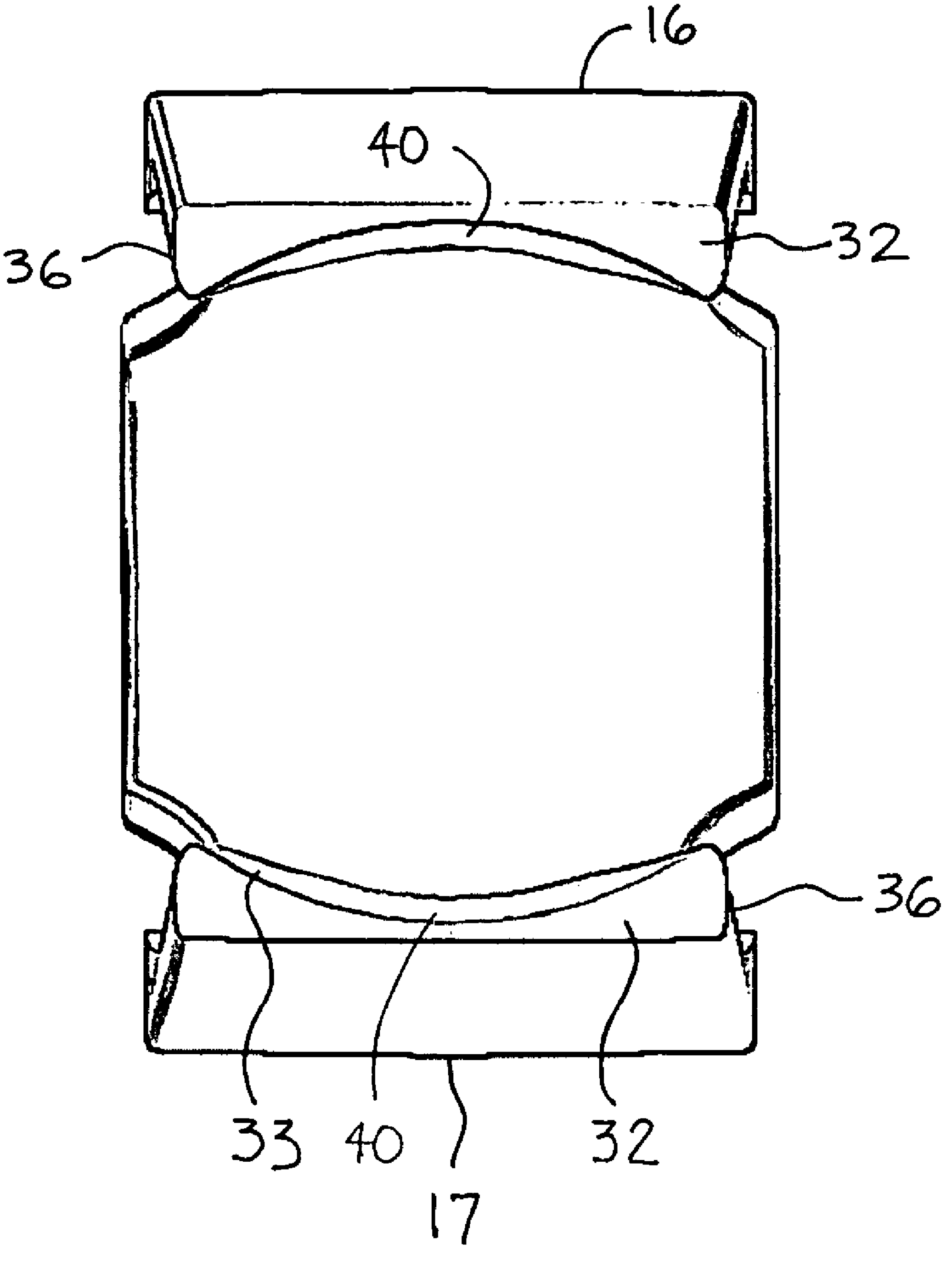
FIG. 6 is a front view of the wing holder of FIG. 4.

As shown in FIGS. 4-6, each row of teeth 33 preferably has a single tooth that with a tapered edge that extends between longitudinal edges 36. The edges of rows of teeth 33 define notch 40 as described previously and preferably has an arcuate shaped. In this one preferred embodiment, the taper of the edge of rows of teeth 33 gradually increases from a minimum at the portion in proximity to longitudinal edges 36 to a maximum in the central portion of rows of teeth 33. The increased taper provides an increased depth of penetrating bite of row of teeth 33 through food pieces and a sharper edge with which to clench a portion of a bone of a chicken wing, for example.

Figure 7:
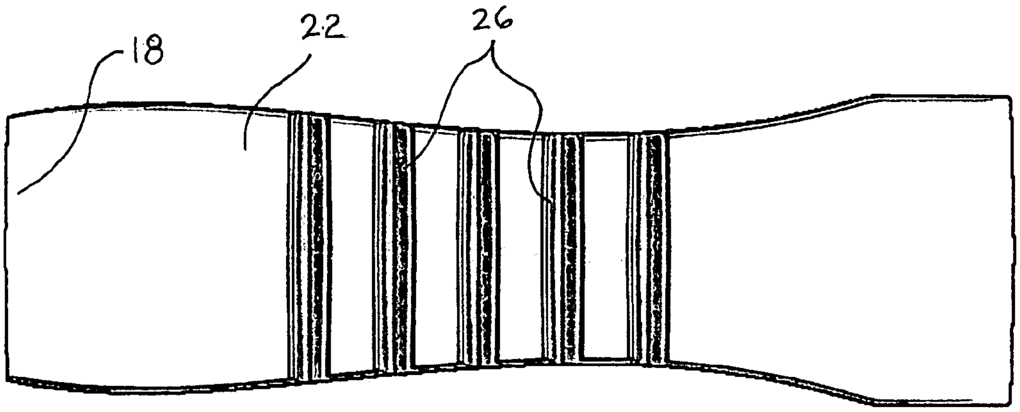
FIG. 7 is a plan view of the wing holder of FIG. 4.

Referring now to FIGS. 4, 5 and 7, second set of teeth 34 extend from the axis defined its respective arm 16 or 17 a predetermined distance. Each of the rows 35 of set of teeth 34 preferably has a tooth that defines a single straight edge between longitudinal edges 38. The edges of rows of teeth 35 extend to a height that is approximately equal to or less than the height of rows of teeth 33 from their respective first or second axes. Rows of teeth 35 in this preferred embodiment are angled in a distal direction from inward surface 20 and are approximately in a direction towards the opposed arm 16 or 17.

Figure 8:
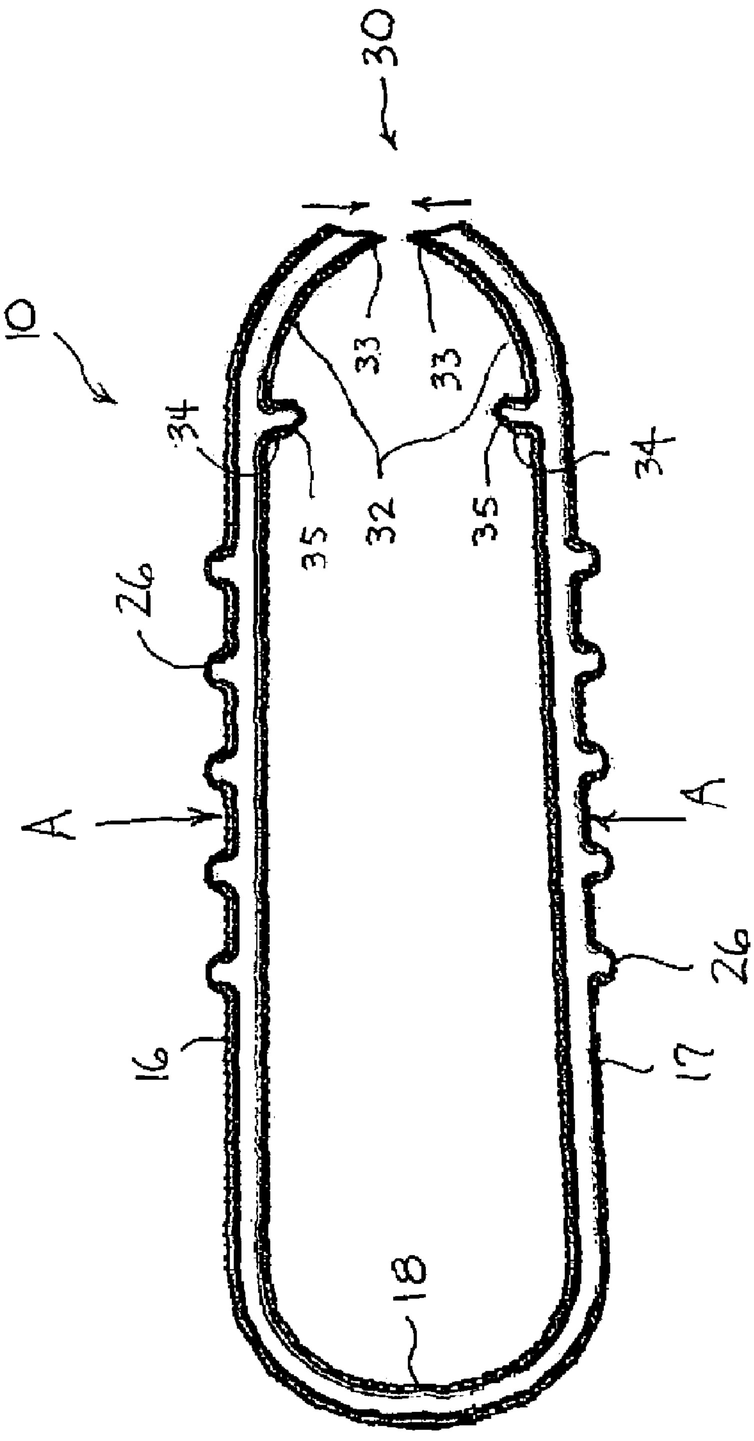
FIG. 8 is a side view of the wing holder of FIG. 4 in a second position.

As shown in FIGS. 4, 7 and 8, wing holder 10 preferably includes grip enhancements 26 on the outer surface 22 of arms 16 and 17. Grip enhancements 26 can assist in the application of forces-A for the movement of arms 16 and 17 about joint 18 between the open and closed positions of wing holder 10.

Referring now to FIGS. 1, 4 and 8, wing holder 10 flexes between the first and second positions through the selective application of inwardly directed forces, as shown by arrows-A. In the above two embodiments, wing holder 10 is constructed such that arms 16 and 17 are preset to be open in the first position. When forces-A are applied to arms 16 and 17, arms 16 and 17 flex inwardly from joint 18 towards the closed position. When forces-A are released, the resilient bias of joint 18 returns arms 16 and 17 to their initial position.

Figure 9:
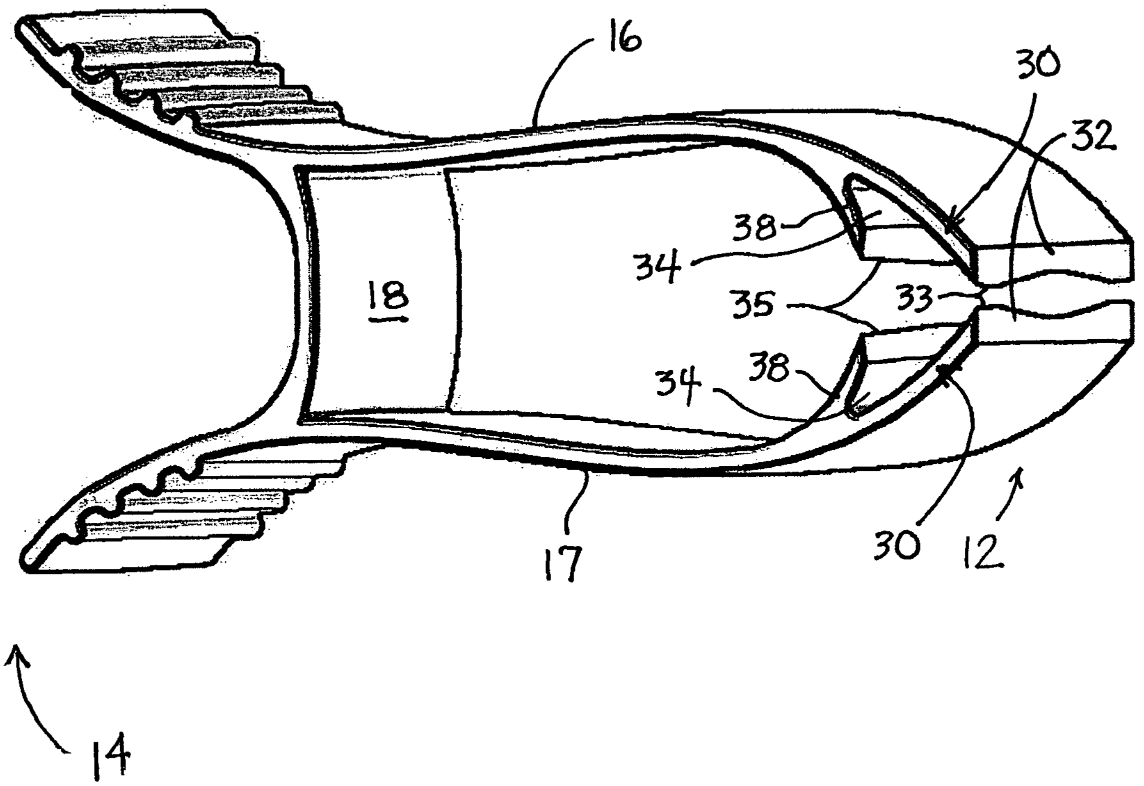
FIG. 9 is a side and front perspective view of a third embodiment of the wing holder of FIG. 1 in the first position.
Figure 10:
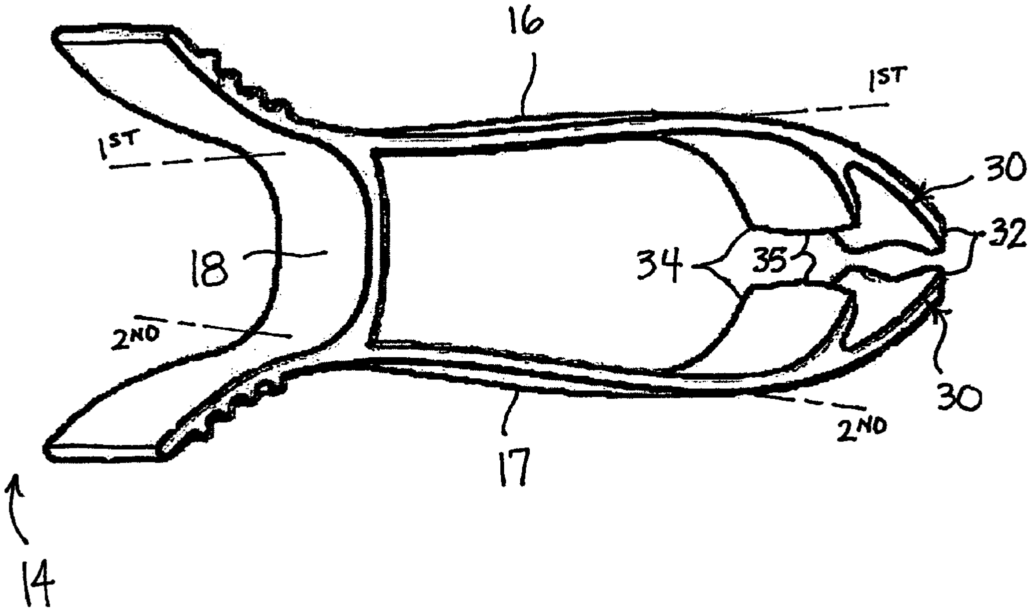
FIG. 10 is a side and rear perspective view of the wing holder of FIG. 9.

As shown in FIGS. 9 and 10, a third embodiment of wing holder 10 is in an initial position with jaws 30 closed. Arms 16 and 17 extend proximal to joint 18 and preferably flare outwardly from the first and second axes, respectively. Joint 18 is positioned between proximal end portion 14 and distal end portion 12. Jaws 30 each include first set of teeth 32 and second set of teeth 34 as described previously. First set of teeth 33 preferably has a single tooth in this embodiment that has a tapered edge that defines a notch 40. The distal end portion of arms 16 and 17 have an arcuate shape that extends at least partially in an inward direction as described previously for the second embodiment.

Figure 11:
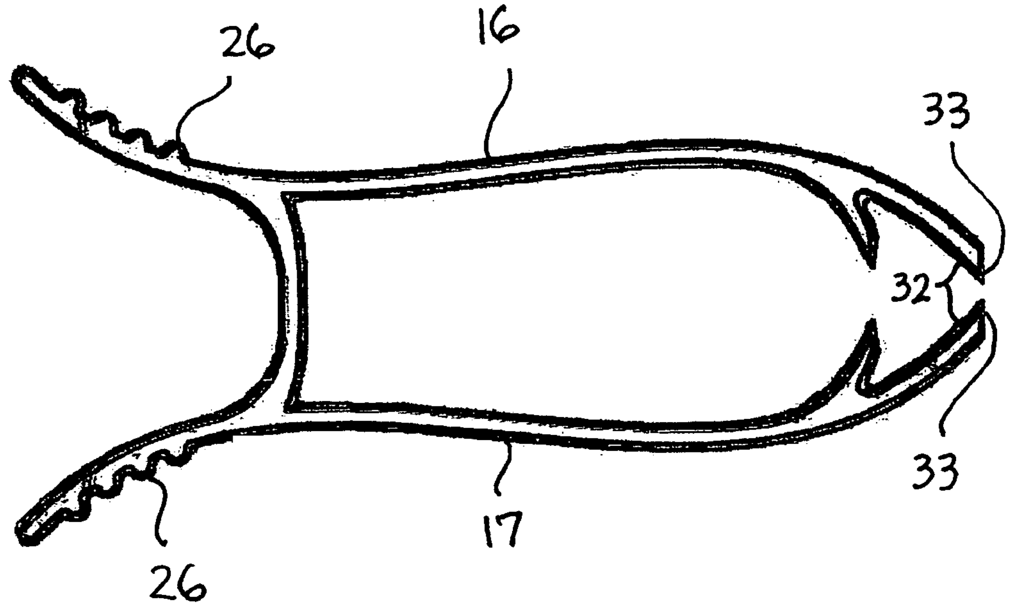
FIG. 11 is a side view of the wing holder of FIG. 9.

Referring now to FIGS. 10 and 11, second set of teeth 34 extend inwardly from the first and second axes of arms 16 and 17. Set of teeth 34 in this embodiment preferably extend distally at angle from axis-Y (see FIG. 1). The edges of rows of teeth 35 define a straight line between longitudinal edges 38, but the edges of rows of teeth 35 can also be concave or straight depending upon the desired application of wing holder 10.

Figure 12:
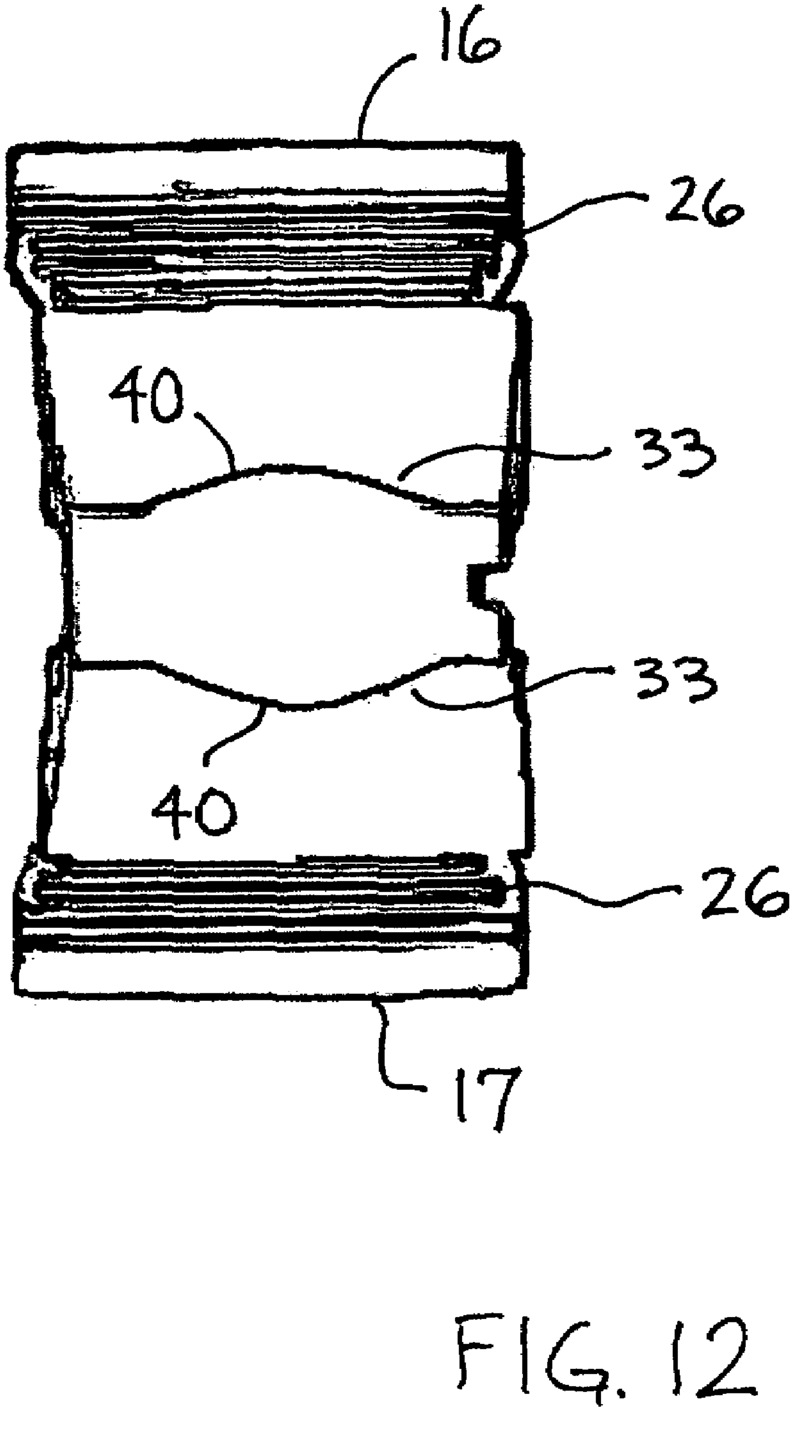
FIG. 12 is a front view of the wing holder of FIG. 9.
Figure 13:
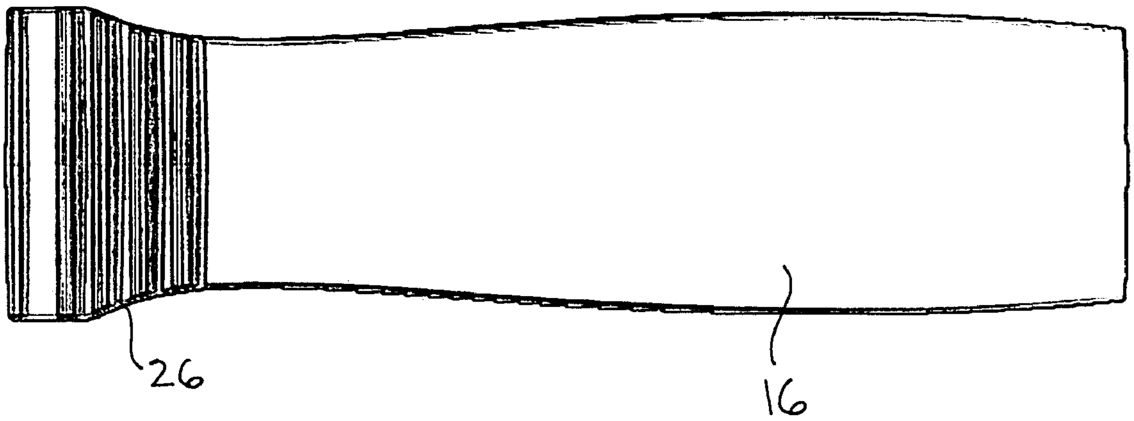
FIG. 13 is a plan view of the wing holder of FIG. 9.
Figure 14:
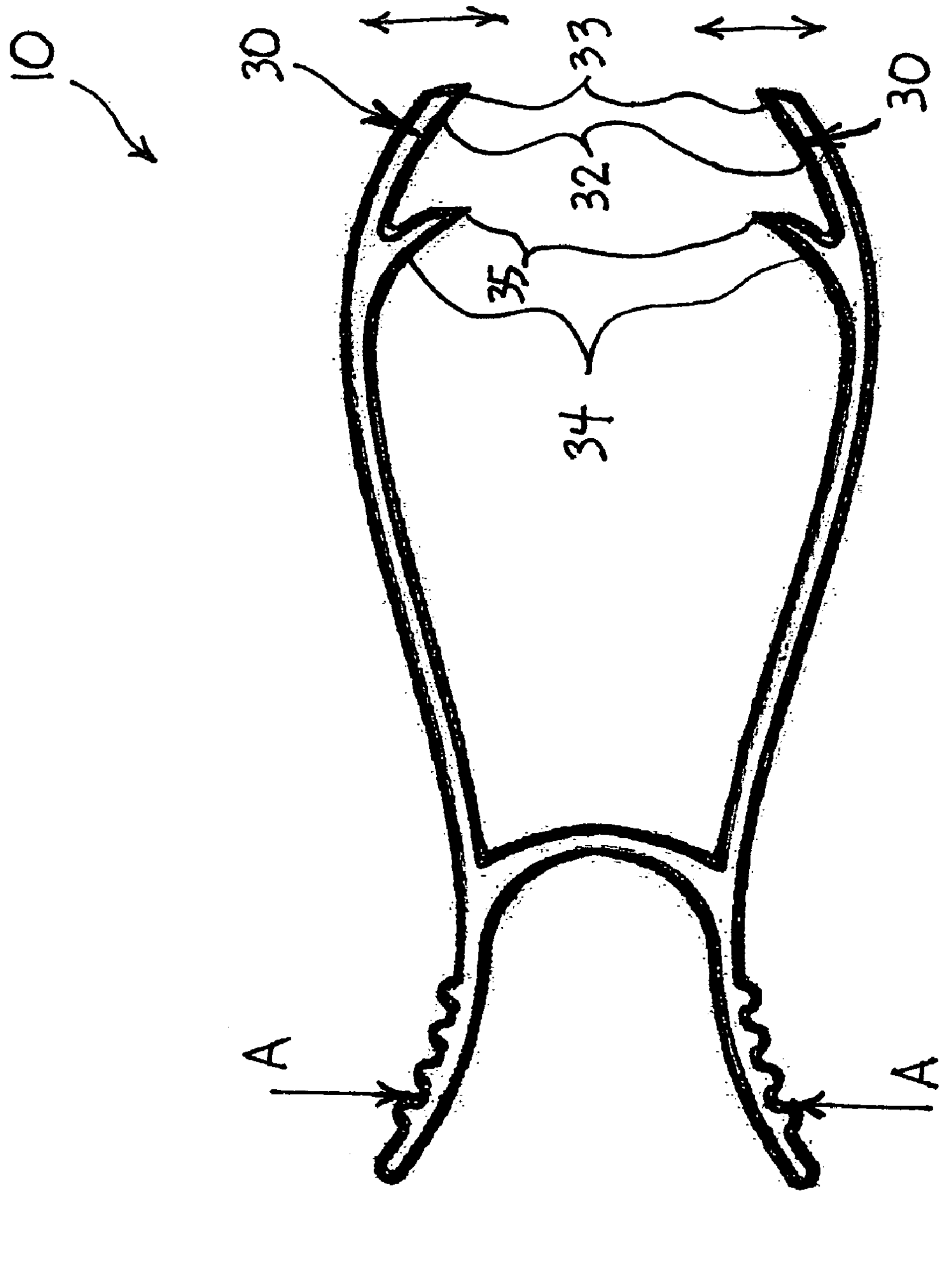
FIG. 14 is a side view of the wing holder of FIG. 9 in the second position.

As shown in FIGS. 11-13, the edges of rows of teeth 33 in the initial or first position can be in direct contact or in close proximity depending upon the desired application of wing holder 10. Grip enhancements 26 are included on the proximal end portion of arms 16 and 17.

Referring now to FIGS. 1-14, in operation wing holder 10 is moved between the first and second positions by the application of forces-A. The release of forces-A applied to move arms 16 and 17 returns wing holder 10 to the first position. Jaws 30 in the open position provide sufficient clearance for wing holder 10 to be readily positioned around or over finger foods such as appetizers, hors d'oeuvres, chicken pieces or ribs, but it is understood that wing holder can be sized for a range of food pieces. Notch 40 is specifically structured to advantageously clench food pieces such as chicken wings, pork ribs and beef ribs and retain those food pieces fixedly in position during eating. Additionally, row of teeth 33 or the plurality of individual teeth in row of teeth 33 can include a tapered free end that is structured to pinch, seize, engage and assist in retaining food pieces during the eating process.

Second set of teeth 34 provides an advantageous second engagement of food pieces by rows of teeth 35 that precludes the undesirable rotation of food pieces such as, for example, in a plane approximately defined by axes X-Z (see FIG. 1). The second set of teeth 34 is additionally particularly advantageous because of the elongate structure and varying weight distribution of food pieces such as ribs can induce the food pieces to rotate when held on one end by a single set of teeth during the eating process. It is understood that two wing holders 10 can be used with a given food piece such as, for example, ribs or corn on the cob.

As shown in FIGS. 1-8, in the first and second embodiments jaw 30 in the initially open position is placed or positioned around or over the food piece. Forces-A are applied to each of arms 16 and 17 to clench, seize and/or securely retain the food piece in jaws 30. The food piece is retained in jaws 30 by the continued application of forces-A. As desired, the food piece is released by removing at least one of the forces-A applied to arm 16 and arm 17.

Referring to the third embodiment as shown in FIGS. 9-14, when forces-A are applied to the proximal end portion of arms 16 and 17, arms 16 and 17 flex about joint 18 from the first closed position to the second open position. In the second position, the selected piece of food is positioned between the opened jaws 30 and the piece of food is retained in jaws 30 by removing at least one of forces-A applied to arm 16 and arm 17. Upon the removal of forces-A, the resilience of joint 18 moves jaws 30 to the closed position securely seizing the selected piece of food. The selected piece of food is then released by the application of force-A on the proximal end portions of arms 16 and/or 17 to move jaws 30 to the second open position.

Although the illustrative embodiments of the present disclosure have been described herein with reference to the accompanying drawings, it is to be understood that the disclosure is not limited to those specific embodiments and that various other changes and modifications will be apparent to one of ordinary skill in the art without departing from the scope or spirit of the invention which is to be defined with reference to the following claims.

What is claimed is:

1. A wing holder that comprises:

a joint that connects a first elongate arm and a second elongate arm, the arms extend in an adjacent relationship to one another from the joint, a first arm defines a first straight axis and has a distal end portion and a proximal end portion, a second arm defines a second straight axis has a distal end portion and a proximal end portion, the arms have opposed inwardly facing surfaces, outwardly facing surfaces and outer side edges;

a jaw connected to the distal end portion of the inwardly facing surface of each of the arms, each of the jaws has a first distal set of teeth that includes a first row of teeth and a second proximal set of teeth that includes a second row of teeth, the first row of teeth and second row of teeth are separate, approximately perpendicular to the first straight axis and second straight axis and positioned in fixed spaced relation, each of the rows of teeth has a distal face, a proximal face, outer sides and define a terminal free end, the sets of teeth extend in a direction approximately towards the adjacent arm; and a notch is defined by the terminal free ends of the first rows of teeth, the second rows of teeth on each arm have a height that extends from the straight axis of that arm that is less than a height of the first row of teeth from the straight axis of that arm.

2. The wing holder of claim 1, wherein the inwardly facing surfaces vary in height between the outer side edges of the arms and the first rows of teeth extend from the varying inwardly facing surfaces to define a notch.

3. The wing holder of claim 1, wherein the inwardly facing surfaces are arcuate between the outer side edges of the arms and the terminal free ends of the rows of teeth have an approximately uniform length that define an arcuate notch.

4. The wing holder of claim 1, wherein the terminal free ends of the second rows of teeth define straight edges.

5. The wing holder of claim 1, wherein the terminal free ends of the second rows of teeth define a notch.

6. The wing holder of claim 1, wherein the joint is positioned between distal end portion and the proximal end portion of the arms.

7. The wing holder of claim 1, wherein the terminal free ends of the second rows of teeth are angled in the distal direction.

8. The wing holder of claim 1, wherein the joint flexes to move the arms between a first and a second position.

9. The wing holder of claim 1, wherein the joint connects the proximal end portion of the arms.

10. The wing holder of claim 1, wherein the second rows of teeth are angled in a distal direction from the inwardly facing surface.

11. A wing holder that comprises:

a pair of elongate arms connected by a joint, the arms extend in an adjacent relationship to one another from the joint, a first arm defines a first straight axis and has a distal end portion and a proximal end portion, a second arm defines a second straight axis and has a distal end portion and a proximal end portion, the arms have opposed inwardly facing surfaces and outwardly facing surfaces and outwardly facing side edges;

a jaw connected to the distal end portion of the inwardly facing surface of each of the arms, each of the jaws has a first distal set of teeth that includes a first row of teeth and a second proximal set of teeth that includes a second row of teeth, the first set of teeth and second set of teeth are separate, the rows of teeth approximately perpendicular to the first straight axis and second straight axis and positioned in fixed spaced relation, each of the rows of teeth has a distal face, a proximal face, outer sides and define a terminal free end, the sets of teeth extend in a direction approximately towards the adjacent arm; and a notch is defined by the terminal free ends of the first row of teeth and the terminal free ends of the second row of teeth defining an approximately straight line, the first row of teeth having a first length and the second row of teeth having a second length that is less than the first length.

12. The wing holder of claim 11, wherein the terminal free ends of the second rows of teeth are angled in a distal direction.

13. The wing holder of claim 11, wherein the joint is positioned between distal end portion and the proximal end portion of the arms.

14. The wing holder of claim 11, wherein the second row of teeth is angled in a distal direction from the inwardly facing surface.

15. The wing holder of claim 11, wherein the joint flexes to move the arms between the open position and the closed position.

16. The wing holder of claim 11, wherein the joint connects the proximal end portion of the arms.

* * * * *